Oct. 17, 1967　　　　　D. E. THOMAS　　　　　3,347,750
HIGH TEMPERATURE NUCLEAR FUEL ELEMENTS
Filed Nov. 16, 1965

WITNESSES
Theodore F. Wrobel
Lee P. Johns

INVENTOR
Donald E. Thomas
BY
Frederick Shope
ATTORNEY

United States Patent Office 3,347,750
Patented Oct. 17, 1967

3,347,750
HIGH TEMPERATURE NUCLEAR FUEL ELEMENTS
Donald E. Thomas, Mount Lebanon Township, Pittsburgh, Pa., assignor to Westinghouse Electric Corporation, Pittsburgh, Pa., a corporation of Pennsylvania
Filed Nov. 16, 1965, Ser. No. 508,042
12 Claims. (Cl. 176—69)

This invention relates to nuclear fuel elements for use at elevated temperatures, and more particularly, it pertains to fuel elements operable for extended periods of time at elevated temperatures.

Developments in atomic power have continually pointed to the need for fuel elements capable of operating for extended periods of time at higher and higher temperatures. Nuclear reactors and associated systems intended to supply substantial amounts of power in satellites and space vehicles must have a minimal size and weight for which reason among others, fuel element temperatures of the order of 1800° to 2500° F. are desirable. In addition to being capable of high temperature operation fuel elements in reactors for space applications must be capable of reliable operation for periods of time in excess of one year. Reactors operating in the indicated temperature range are most likely to use liquid metal, metal vapor, or inert gas as a coolant.

In order to operate in such an environment high temperature fuel elements must include materials having such properties as resistance to swelling, fission gas retention, high melting temperature, high thermal conductivity, structural integrity, and resistance to corrosion by the coolant. It is essential that the fuel material be unsusceptible to gross swelling resulting from the aggregation of fission gasses. Complete fission gas retention is a desirable property because it permits greater latitude in fuel element design, since otherwise, means for collecting evolved gases must be provided. A high melting temperature is required because melting of the central portion of the fuel element operates as a limitation.

Moreover, high thermal conductivity is necessary to limit the temperature gradient in the fuel, or conversely to obtain maximum power with given center and surface temperatures. With regard to structural integrity, though it is desirable that the fuel remain structurally intact, in unbonded fuel elements this condition is not absolutely necessary. For example uranium dioxide ($UO_2$), a widely used fuel, exhibits cracking but operates successfully. However, it is highly desirable that the fuel material be resistant to attack by the coolant in the event that a defect should develop in the cladding.

It has been found that the foregoing properties may be satisfied by the provision of monocarbides of refractory metals of the sub-groups IVA, VA and VIA of the Periodic Table which include titanium, zirconium, hafnium, vanadium, niobium, tantalum, molybdenum, and tungsten. More particularly the present invention consists essentially of a solid solution of uranium monocarbide with one or more of the refractory metal carbides TiC, ZrC, VC, NbC, TaC, MoC, and WC.

Accordingly, it is an object of the present invention to provide a nuclear fuel composition having very high melting points as well as satisfactory thermal conductivities.

It is another object of this invention to provide nuclear fuel compositions having a solid solution of uranium monocarbide with binary or ternary combinations with refractory metal monocarbides of the sub-groups IVA, VA, VIA of the Periodic Table.

It is another object of this invention to provide high temperature nuclear fuel elements utilizing uranium monocarbide in solid solution with one or more monocarbides of the refractory metal as fuel materials and having the fuel materials encased within a cladding container of refractory metal.

Other objects and advantages of the invention will appear hereinafter.

The present invention consists essentially of a nuclear fuel element including an elongated tube having closed ends, a plurality of fuel pellets within the tube and in end-to-end abutment, the tube being composed of a refractory metal such as molybdenum, niobium, rhenium, tantalum, tungsten, or base alloys thereof, and each pellet being composed of a solid solution of uranium monocarbide (UC) in monocarbides of refractory metals. The present invention, however, is not limited to fuel element of the tubular type for containing fuel pellets. The invention includes other geometrical shapes such as disks.

In accordance with the present invention binary and ternary alloys of refractory base metal carbide and uranium carbide have been produced comprising from 80 to 95 mol percent refractory metal monocarbide and from 5 to 20 mol percent uranium monocarbide, and the balance being small amounts of incidental impurities with or without an additional monocarbide of another refractory metal. The alloys are characterized by very high melting points and in addition have thermal conductivities which lie between those of the metals and the oxide refractories.

For a better understanding of the nature and objects of this invention reference is made to the drawings in which.

Figure 1:
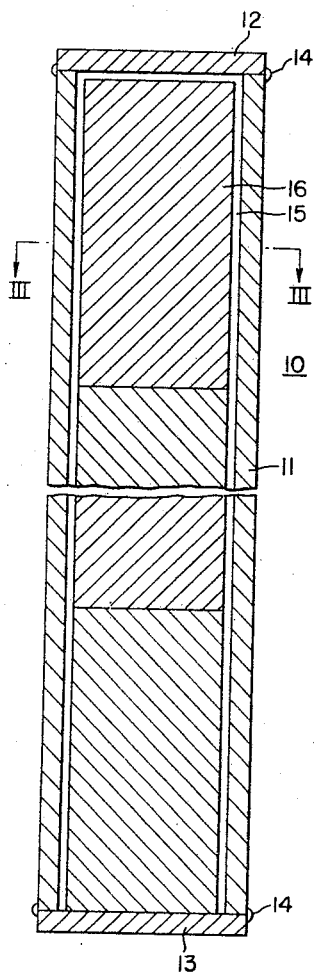
FIGURE 1 is a longitudinal cross-section through a nuclear fuel element.

In FIGURE 1 a fuel element is generally disclosed at 10. It includes an elongated tube or cladding member 11 having end caps 12 and 13 which are secured to the tube in a fluid tight manner by similar welds 14. The tube 11 and caps 12 and 13 provide a chamber 15 in which a plurality of fuel pellets 16 are disposed in end-to-end abutment which pellets have a slightly smaller diameter than the diameter of the inner surface of the tube 11 and provide a small clearance space therebetween. This space enables the pellets to expand into close contact with the walls of the tube as they heat up in service.

The tube 11 has a diameter of about ⅜ inch and is composed of either unalloyed refractory metal, such as molybdenum, niobium, tungsten, tantalum, or preferably alloys based on said metals. Examples of typical binary alloys for the tube are molybdenum with about 0.5 weight percent titanium or niobium alloyed with 1 weight percent zironium. The tube may have other compositions as follows:

(1) Niobium alloyed with 5 weight percent molybdenum, 5 weight percent vanadium, and 1 weight percent zirconium;

(2) Tantalum alloyed with 9.6 weight percent tungsten, 2.4 weight percent hafnium, and 0.01 percent carbon; and (3) Tantalum alloyed with 8 percent tungsten, 1 percent rhenium, 0.7 percent hafnium, and 0.025 percent carbon.

In accordance with the invention the above-listed alloys of the refractory metals possess sufficiently high strength at elevated temperatures and sufficient resistance to attack by molten alkali metals such as, sodium or potassium.

The pellets 16 are composed of a solid solution of uranium monocarbide with one or more refractory metal carbides. Particularly, suitable mixed carbide compositions are listed in Table I.

TABLE I
[Carbide compositions, mol percent]

| UC | NbC | TiC | ZrC | TaC | WC | MoC |
|---|---|---|---|---|---|---|
| 5-90 | 10-95 | | | | | |
| 5-90 | 10-95 | | | 1-9 | | |
| 5-90 | 5-90 | | 5-90 | | | |
| 5-90 | | 10-95 | | | | |
| 5-90 | | 10-95 | | | 1-30 | |
| 5-90 | | | 10-95 | | | |
| 5-90 | | | 10-95 | | | 1-15 |

The optimum compositions of uranium carbide for each of the compositions listed in Table I is about 80 mol percent. Other compositions may also include 20 mol percent of uranium carbide, 71 to 75 mol percent of niobium carbide, and 1 to 9 mol percent of tantalum carbide, a specific example being 20 mol percent of uranium carbide, 75 mol percent of niobium carbide, and 5 mol percent of tantalum carbide.

Hafnium carbide may be added to any of the listed binaries or ternaries composition of Table I for the purpose of providing an integral burnable poison. The compositions of such solid solution compositions may include hafnium carbide additions of about 5 to 10 mol percent. Moreover, the properties of the fuel may be altered by partial substitution of nitrogen atoms for carbon atoms on a one-for-one basis.

Various properties of the individual refractory metal carbides listed above are shown in Table II.

TABLE II.—PROPERTIES OF THE REFRACTORY METAL MONOCARBIDES

| Carbide | Melting Point (° C.) | Lattice Parameter (A.) | Density (g./cc.) | Thermal Conductivity (watts/cm. ° C.) | Coefficient of Expansion (° C.$^{-1}$) | Thermal Neutron Cross Section of Metal (Barns) |
|---|---|---|---|---|---|---|
| TiC | 3,250 | [1] 4.329 | 4.93 | 0.171 | | 5.8 |
| ZrC | 3,175 | 4.695 | 6.8 | 0.204 | 6.7×10$^{-6}$ | 0.18 |
| HfC | 3,890 | 4.641 | 12.7 | | 7.4×10$^{-6}$ | 105 |
| VC | 2,800 | 4.168 | 5.36 | | | 4.98 |
| NbC | 3,500 | 4.469 | 7.8 | 0.142 | | 1.2 |
| TaC | 3,800 | 4.45 | 14.5 | 0.222 | 8.1×10$^{-6}$ | 21.0 |
| MoC [2] | 2,650 | [3] 2.898 | | | | 2.7 |
| WC | [4] 2,600 | [2] 2.906 | 15.6 | | 5.2–7.3×10$^{-6}$ | 19.2 |
| UC | 2,590 | 4.951 | [6] 13.6 | 0.25 | [7] 12×10$^{-6}$ | |

[1] Structure is Cubic, NaCl type except MoC and WC which are hexagonal.
[2] Unstable below 700–1,900° C., transforms to Mo$_2$C plus C.
[3] C=2.809.
[4] Decomposes to liquid plus graphite.
[5] C=2.837.
[6] X-ray density.
[7] 500–600° C.

It is evident that the carbides have very high melting points and thermal conductivities which lie between those of the metals and the refractory metal oxides and sulfides. When considering a particular carbide fuel element for use in a reactor, the power handling capabilities from the central axis of the surface by using the integral of the carbide are calculated.

$$\int_{\text{surface}}^{\text{center}} K(T)\,dt$$

where K(T) is the thermal conductivity as a function of temperature and T is the temperature in degrees centigrade. In the case of a uranium dioxide (UO$_2$) rod the integral has a value of about 35 watts per centimeter of length if the surface temperature is fixed at 1000° C. and the melting point (2760° C.) of UO$_2$ is taken as the maximum allowable center temperature. The values given in Table II for low temperature conductivity of the refractory metal carbides indicate that the power handling capabilities of carbide based fuel elements would be about four times greater than that of UO$_2$ assuming the same surface temperature and the melting point of the carbide as the limiting center temperature. Thus, the high melting points of the refractory metal monocarbides are a definite advantage.

The fact that most of the refractory metal monocarbides have a cubic structure with a narrow range of lattice parameters is significant. The mutual solubilities that result therefrom are shown in Table III.

TABLE III.—MUTUAL SOLUBILITIES OF COMPOUNDS
[Weight percent of A in B]

| A \ B | TiC | ZrC | HfC | VC | NbC | TaC | MoC | Mo$_2$C | WC | UC | TiN | VN | NbN | ZrN |
|---|---|---|---|---|---|---|---|---|---|---|---|---|---|---|
| TiC | | 100 | | 100 | 100 | 100 | | S | S | | | | | 100 |
| ZrC | 100 | | — | a | 100 | 100 | | | — | 100 | | | | 100 |
| HfC | | | | | 100 | | | | | | | | | |
| VC | 100 | 5 | | | 100 | 100 | | | | | | | | |
| NbC | 100 | 100 | | 100 | | 100 | | | | 100 | | 100 | | |
| TaC | 100 | 100 | 100 | 100 | 100 | | | | 3 | 100 | | | | 100 |
| MoC | | | | | | | | | | | | | | |
| Mo$_2$C | 85 | 26 | | 76 | 75 | 70 | | | | | | | | |
| WC | 55 | 15 | | 76 | 45 | 15 | | 53 | | | | | | |
| UC | | 100 | | | 100 | 100 | | | | | | | | |
| TiN | 100 | 100 | | 100 | 100 | 100 | | | | | | | | |
| VN | 100 | S | | 100 | 100 | 100 | | | | | | | | |
| NbN | | | | | 100 | | | | | | | | | |
| ZrN | 100 | 100 | | S | S | 100 | | | | | | | | |

S = Slight Solubility

From the above table, it will be evident that there are thirteen pairs of carbides known to exhibit a continuous series of solid solutions. Uranium monocarbide is completely soluble in zirconium carbide, tantalum carbide, and niobium carbide and complete solubility in titanium carbide and hafnium carbide is indicated as well, since the respective lattice parameters differ by considerably less than 15%. The lattice parameters should not differ by more than 15% for complete solubility. Thus, the mutual solubility of vanadium carbide and uranium carbide is doubtful because the lattice parameters differ by 15.8%. In addition there are a number of systems in which there is partial but probably useful solubility. For example, tungsten carbide is partially soluble in titanium carbide and it is believed that a fuel containing titanium carbide, tungsten carbide, and uranium carbide will have better properties than one containing only titanium carbide and uranium carbide. Accordingly, there exists a wide latitude in composition with which to work both with respect to the electropositive and the electronegative components.

Figure 2:
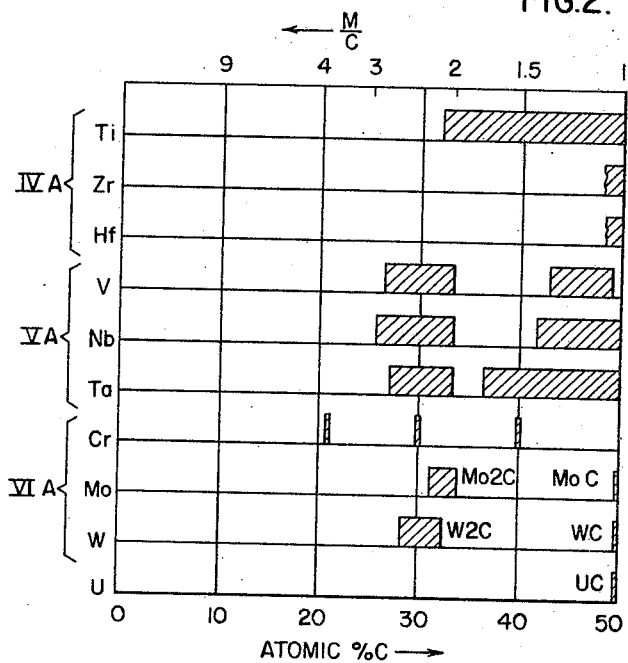
FIG. 2 is a graph showing the composition range over which the carbides of various refractory metals and of uranium exist in solid solution.
Figure 3:
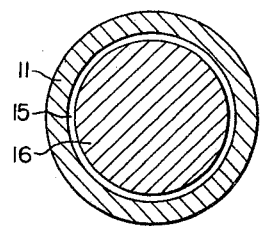
FIG. 3 is a transverse sectional view taken on the line III—III of FIG. 2.

An equally interesting aspect of the refractory metal carbides is the range of compositions over which they are stable. Referring to FIG. 2, the hatched areas indicate solid solutions. As shown in FIGURE 2, molybdenum carbide, tungsten carbide, and uranium carbide show essentially no deviation from the stoichiometric ratio, but titanium carbide, vanadium carbide, niobium carbide, and tantalum carbide exhibit quite large deviations. The latter are of special interest as a fuel base because they are more likely to be capable of sustaining the changing metal to carbon ratio (M/C) which accompanies fission where M and C are the number of metal and carbon atoms respectively. For example, a fuel based upon niobium carbide, initially with M/C=1, would require about 40% of the metal atoms to be fissioned for the M/C ratio to reach its upper limit of 1.4, assuming that all of the fission products behave like niobium in the carbon lattice. While the assumption is undoubtedly imperfect, it does not seem to be unreasonable to expect that it may be correct for burnups on the order of 2 or 3 percent of the metal atoms.

Uranium monocarbide itself is a promising fuel for use in reactors, because for a burnup of about 2% and a peak temperature of about 1500° F. there is negligible volume change or fission gas release. Evidently the UC lattice is capable of accommodating fission gas. Since most of the refractory monocarbides have this same crystal structure it is reasonable to expect that solutions of UC in them would also be capable of retaining the fission gases Xe and Kr. A comparison of the size of the interstitial space in the various refractory cubic carbides based on a hard sphere model is presented in Table IV.

TABLE IV
[Lattice space in cubic refractory carbides] [1]

| Carbide | Diameter of Interstitial Space at Position 1/4,1/4,1/4 (A.) | Diameter of Substitutional Space (Metal Sites) (A.) |
| --- | --- | --- |
| TiC | 0.93 | 2.82 |
| ZrC | 0.88 | 3.18 |
| HfC | 0.89 | 3.13 |
| VC | 0.95 | 2.66 |
| NbC | 0.91 | 2.96 |
| TaC | 0.72 | 2.95 |
| UC | 0.85 | 3.44 |

[1] The carbon atoms are assumed to have a diameter of 1.511 A. as in diamond.

With the exception of TaC the other carbides have somewhat more available space than does UC. It is, however, obvious that Xe and Kr atoms having atomic diameters of 3.80 and 3.34 A. respectively would create very large strains if forced into the interstitial sites lying at the 1/4, 1/4, 1/4 coordinates of the crystal lattice. This would suggest that inert gas atoms may prefer to occupy sites normally occupied by the metal atoms since these are larger. There is some evidence, however, that Xe and Kr may actually be ionized when present in a lattice and this would reduce their diameters considerably.

On the basis of the preceding discussion it is believed that NbC is the most attractive base for a highly enriched monocarbide, fuel since it provides a very high melting point, wide existence range, and low cross-section. ZrC and TiC are sufficiently attractive to warrant serious consideration. TaC appears to have too high a cross-section to deserve serious consideration. This is true of HfC also, but in this case it is possible that some hafnium could be substituted in the carbide fuels to serve as a burnable poison. The monocarbides of molybdenum and tungsten do not appear interesting because of low melting or decomposition temperatures.

It is contemplated that the carbide fuels would be clad with refractory metal sheaths because the fuel element surface temperature range indicated is such that only the refractory metals or their alloys will exhibit adequate strength. In the cast of the applications involving alkali metal or alkali metal vapor as the coolant the refractory metals also appear to be adequately resistant to corrosion.

The following example is illustrative of the present invention.

Example

A pellet having 20 mol percent uranium carbide and 80 mol percent niobium carbide was prepared by the following procedure:

(1) Pieces or particles of uranium, niobium, and carbon were mixed and placed in a water-cooled copper crucible,
(2) The charge was arc-melted to a temperature above the melting point of the higher melting metal,
(3) The charge was cooled in the crucible,
(4) The charge was crushed to a powder,
(5) The charge was placed in a graphite die and hot-pressed and sintered at a temperature of 2450° C. for five minutes under a pressure of 6000 p.s.i., and
(6) The resulting pellet was ground by centerless grinding to a diameter of 0.281 inch.

Instead of the hot-pressing and sintering step of Step 5, the powder may be cold-pressed and sintered. In the alternative, the pellets may be made by placing pieces of uranium and niobium in a graphite crucible which may be heated to a temperature above the melting points of the metals to permit diffusion of carbon into the charge until stoichiometric compositions are obtained.

Accordingly, this invention provides fuel elements capable of operating for extended periods of time at very high temperatures. A nuclear reactor fuel rod having the construction and fuel element compositions disclosed is intended to supply substantial amounts of power in satellites and space vehicles as well as in certain special terrestrial reactor applications wherein small size and high temperatures are important.

It should be understood that the above-description is only exemplary and not in limitation of the invention.

What is claimed is:

1. A fuel element for use in a nuclear reactor comprising a tube having an internal hollow space of predetermined dimensions and being composed of at least one metal selected from the group consisting of molybdenum, niobium, tungsten, tantalum, and base alloys thereof, a plurality of pellets of sintered fissionable material disposed in end-to-end abutment within the space, the pellets having a diameter slightly less than that of the inner surface of the tube whereby a gap is present between the pellets and the inner surface, and the fissionable material being a solid solution composed of from 5 to 90 mol percent uranium monocarbide and the balance being at least one of the compounds selected from the group consisting of niobium carbide, tantalum carbide, titanium carbide, molybdenum carbide, tungsten carbide, and zirconium carbide.

2. The fuel element of claim 1 in which the pellets of fissionable material include from 5 to 10 mol percent of hafnium carbide.

3. The fuel element of claim 1 in which the fissionable material consists essentially of about 20 mol percent uranium carbide.

4. The fuel element of claim 1 in which the fissionable material consists essentially of about 20 mol percent of uranium carbide, and about 80 mol percent of niobium carbide.

5. The fuel element of claim 1 in which the fissionable material consists essentially of about 20 mol percent of uranium carbide, 71 to 79 mol percent of niobium carbide and of 1 to 9 mol percent of tantalum carbide.

6. The fuel element of claim 1 in which the fissionable material consists essentially of about 80 mol percent of uranium carbide.

7. The fuel element of claim 6 in which the compound included with the fissionable material consists essentially of about 20 mol percent of niobium carbide.

8. The fuel element of claim 6 in which the compound included with the fissionable material consists essentially of about 20 mol percent of titanium carbide.

9. The fuel element of claim 6 in which the compound included with the fissionable material consists essentially of about 20 mol percent of zirconium carbide.

10. The fuel element of claim 1 in which the fissionable material consists essentially of 5 to 95 mol percent uranium carbide, 10 to 90 mol percent niobium carbide, and 1 to 9 mol percent tantalum carbide.

11. The fuel element of claim 1 in which the fissionable material consists essentially of 5 to 95 mol percent uranium carbide, 10 to 90 mol percent titanium carbide, and 1 to 30 mol percent tungsten carbide.

12. The fuel element of claim 1 in which the fissionable material consists essentially of 5 to 95 mol percent uranium carbide, 10 to 90 mol percent zirconium carbide, and 1 to 15 mol percent molybdenum carbide.

References Cited

UNITED STATES PATENTS

| | | | |
|---|---|---|---|
| 3,091,581 | 5/1963 | Barr et al. | 176—69 |
| 3,108,936 | 10/1963 | Gale | 176—73 |
| 3,194,745 | 7/1965 | Handwerk et al. | 176—89 X |
| 3,202,586 | 8/1965 | Webb et al. | 176—89 X |
| 3,207,697 | 9/1965 | Benesovsky et al. | 252—301.1 |
| 3,219,541 | 11/1965 | Webb | 252—301.1 X |
| 3,244,599 | 4/1966 | Hildebrand | 176—73 X |

FOREIGN PATENTS 1,321,636  2/1963  France.

OTHER REFERENCES

Missiles and Rockets, Apr. 8, 1963, vol. 12, No. 14, pages 16 and 17.

Nuclear Engineering, August 1960, vol. 5, No. 51, between pages 354 and 355.

BENJAMIN R. PADGETT, *Primary Examiner.*

M. J. SCOLNICK, *Assistant Examiner.*